(12) United States Patent
Gopinath et al.

(10) Patent No.: US 9,037,897 B2
(45) Date of Patent: May 19, 2015

(54) ELASTIC CLOUD-DRIVEN TASK EXECUTION

(75) Inventors: Ramesh Gopinath, Milwood, NY (US); Andrzej Kochut, Croton on Hudson, NY (US); Kathiravan M. Ramaswami, Baltimore, MD (US); Anca Sailer, Scarsdale, NY (US); Charles O Schulz, Ridgefield, CT (US); Hidayatullah Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/399,174

(22) Filed: Feb. 17, 2012

(65) Prior Publication Data

US 2013/0219211 A1    Aug. 22, 2013

(51) Int. Cl.
*G06F 11/00* (2006.01)
*G06F 9/44* (2006.01)
*G06F 11/20* (2006.01)

(52) U.S. Cl.
CPC .......... *G06F 9/4445* (2013.01); *G06F 11/2028* (2013.01)

(58) Field of Classification Search
CPC .................................................. G06F 11/2028
See application file for complete search history.

(56) References Cited

U.S. PATENT DOCUMENTS

| 6,195,760 | B1 | 2/2001 | Chung et al. | |
| 7,925,923 | B1* | 4/2011 | Hyser et al. | 714/13 |
| 7,941,507 | B1 | 5/2011 | Murphy, Jr. et al. | |
| 8,239,863 | B2* | 8/2012 | Bhat et al. | 718/1 |
| 8,316,110 | B1* | 11/2012 | Deshmukh et al. | 709/220 |
| 8,429,630 | B2* | 4/2013 | Nickolov et al. | 717/148 |
| 8,468,455 | B2* | 6/2013 | Jorgensen et al. | 715/733 |
| 8,539,087 | B2* | 9/2013 | Gawali et al. | 709/229 |
| 2002/0174257 | A1 | 11/2002 | Jones et al. | |
| 2003/0187927 | A1 | 10/2003 | Winchell | |
| 2006/0136389 | A1 | 6/2006 | Cover et al. | |
| 2010/0325485 | A1* | 12/2010 | Kamath et al. | 714/15 |
| 2010/0333089 | A1* | 12/2010 | Talwar et al. | 718/1 |
| 2011/0213753 | A1* | 9/2011 | Manmohan | 707/640 |
| 2012/0124193 | A1* | 5/2012 | Ebrahim et al. | 709/224 |

(Continued)

OTHER PUBLICATIONS

ThinApp, http://www.vmware.com/files/pdf/VMware-ThinApp-DS-EN.pdf, 2010, pp. 1-2.

(Continued)

*Primary Examiner* — Michael Maskulinski
(74) *Attorney, Agent, or Firm* — Ryan, Mason & Lewis, LLP

(57) ABSTRACT

A method, an apparatus and an article of manufacture for cloud-driven application execution. The method includes determining a plurality of attributes of a failed application, wherein the plurality of attributes comprises at least one policy context attribute and at least one context attribute, correlating each of the plurality of attributes to at least one alternative asset, wherein the at least one alternative asset is a part of an environment on which the failed application can be executed, using the plurality of attributes correlated to the at least one alternative asset to identify an alternative asset set of alternative assets, wherein the alternative asset set is capable of enabling an alternative environment on which to execute the failed application, and provisioning the alternative assets in the alternative asset set from at least one cloud network to create the alternative environment on which the failed application is executed.

20 Claims, 4 Drawing Sheets

(56) References Cited

U.S. PATENT DOCUMENTS

2013/0103837 A1* 4/2013 Krueger .................. 709/226
2013/0111260 A1* 5/2013 Reddy et al. ................ 714/4.11

OTHER PUBLICATIONS

Blitware File Helper, http://www.blitware.com/products/filehelper/, downloaded Feb. 17, 2012, pp. 1.

OpenWith.org, http://www.pctips3000.com/open-unknown-file-types/, downloaded Feb. 17, 2012, pp. 1-12.

Find Applications for the File Extension, http://www.pctips3000.com/find-applications-for-file-extensions-easily-with-file-extension-lookup-desktop-gadget/, downloaded Feb. 17, 2012, pp. 1-10.

Lagar-Cavilla et al., Interactive Resource-Intensive Applications Made Easy, http://isr.cmu.edu/doc/lagarcavilla07-lncs-reprint.pdf, R. Cerqueira and R.H. Campbell (Eds.): Middleware 2007, LNCS 4834, pp. 143-163, 2007.

* cited by examiner

ELASTIC CLOUD-DRIVEN TASK EXECUTION

FIELD OF THE INVENTION

Embodiments of the invention generally relate to information technology, and, more particularly, to application execution.

BACKGROUND

Challenges exist in the handling of unrecognized tasks such as unknown file types, commands, situations, etc. Many existing approaches are limited to traditional environments, often under specific compliance requirements. The emergence of compute cloud based services facilitates new functionality opportunities given the separation of duties (usage versus provider management of compliant delivery and support). However, a need exists within a cloud computing architecture to effectuate a system or enterprise policy to remote clients.

SUMMARY

In one aspect of the present invention, techniques for elastic cloud-driven task execution are provided. An exemplary computer-implemented method for cloud-driven application execution can include steps of determining a plurality of attributes of a failed application, wherein the plurality of attributes comprises at least one policy context attribute and at least one context attribute, correlating each of the plurality of attributes to at least one alternative asset, wherein the at least one alternative asset is a part of an environment on which the failed application can be executed, using the plurality of attributes correlated to the at least one alternative asset to identify an alternative asset set of at least one alternative asset, wherein the alternative asset set is capable of enabling an alternative environment on which to execute the failed application, and provisioning the at least one alternative assets in the alternative asset set from at least one cloud network to create the alternative environment on which the failed application is executed.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
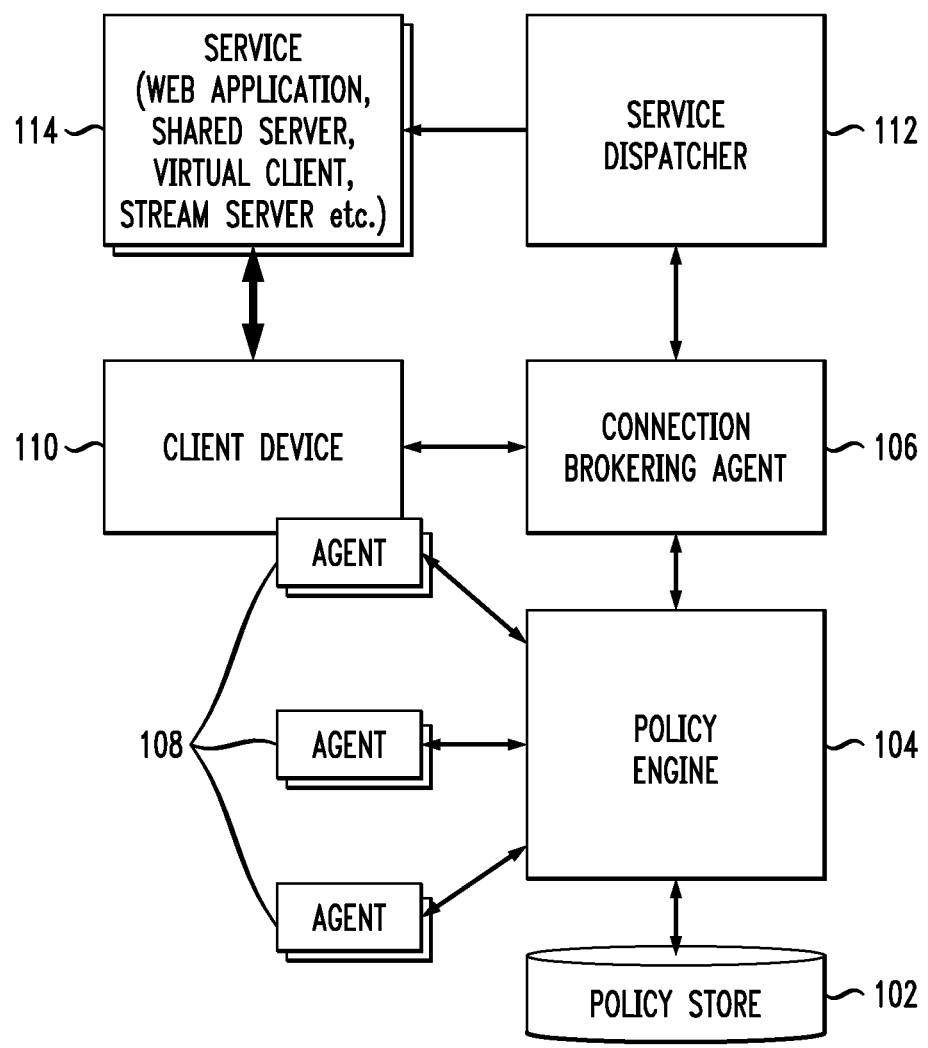
FIG. 1 is a diagram illustrating system architecture, according to an embodiment of the present invention.

As described herein, an aspect of the present invention includes policy-based elastic cloud-driven task execution. An example embodiment of the invention includes a process or agent residing within a cloud computing architecture enabled to effectuate a system or enterprise policy to any number of remote clients through the provisioning of particular sets of virtual machines (VMs). In the same fashion, the process or agent can be location-aware of the dynamic state of each remote client and able to adjust virtual machine provisioning based on this knowledge.

By way of illustration, an example scenario for policy driven desktop action can include the receipt of an e-mail, or file, whose extension is unknown to the user's VM operating environment. An embodiment of the invention can discover the appropriate application which can interpret this file, and securely drive or assist the user to open and execute the file within a compartmentalized environment, for example, based on the user's policy. The policy, by way of example, can be related to, but not limited to, security, mobility, or any appropriate relevant context.

Accordingly and as further detailed herein, aspects of the invention accelerate and simplify a customer experience with new extensions in the desktop service interaction, and also increase the functional scope of the desktop experience.

At least one embodiment of the invention includes assisting a user (end user for desktops or admin for servers) to create an unknown task handling a policy, which can be related to, but not limited to, resource capacity, security, mobility, license, cost, custom context, etc. Additionally, a federated registry can be built that includes applications and services relationships as well as mappings to contexts. Matching application(s)/service(s) can be discovered which can run tasks unrecognized by the original operating system (OS) or application (app) based on a policy.

Also, an aspect of the invention includes using a rating system for open source resources (for example, for new file extensions) and assisting with an ordered list of selected relevant app/service matches. Further, at least one embodiment of the invention includes transparently and compliantly driving or assisting the run, use and termination of a selected app/service within a controlled environment based on a policy (for example, start a new VM and run app).

Additionally, by way of example, an embodiment of the invention can include facilitating a charge depending on policy, user type, license, etc., as well as enabling usage limitations based on cost (for example, usage limited up to $5 charge). Further, the app/service used to handle the unknown task can be subsequently rated.

As such, aspects of the invention include discovering applications and application execution tasks when such items are necessary to a user and unknown. Also, as described herein, an aspect of the invention includes managing a lifecycle of an application execution from start to end in a remote virtual machine based on policies that include the user's preferences for performance, security, etc.

FIG. 1 is a diagram illustrating system architecture, according to an embodiment of the present invention. By way of illustration, FIG. 1 depicts a policy store or database 102, a policy engine 104, a connection brokering agent component 106 and agents 108. Additionally, FIG. 1 depicts a client device 110, a service dispatcher component 112 and a service 114 (a web application, a shared server, a virtual client, a stream server, etc.).

As noted, in an example embodiment of the invention, the system includes one or more client devices which provide a user interface, a policy database to store the policy statements, a policy engine to match the policy statements against the current service request, a set of agents to gather the situational and service request aspects of the action, one or more service providers to deploy the service if required, a connection brokering agent to receive the service requests and dispatch the service and connection actions to fulfill the request, and a cloud which provides all the computing resources with the exception of the client device.

As also in accordance with an example embodiment of the invention, such a system can operate as follows. A user requests a service, for example, by clicking on an icon displayed on the client device or typing a command into the client device. The client device relays this request to the connection brokering agent. The connection S brokering agent relays aspects of the request (client type, specific request, user identity, etc.) to the policy engine to resolve a way to service the request. The policy engine consults the policy database (as well as optionally one or more agents to assess the details of the situation) and determines the best/desired match between the situation and the methods for providing the service. Additionally, the policy engine returns the suggested service method, and possibly several alternatives to the connection brokering agent.

The connection brokering agent dispatches the service, which might, for example, include streaming the application for the service to the device, launching a server or remote client to execute the service for the client, selecting a shared server which is running the request service, or launching the application instance which is already installed on the client device.

Additionally, the connection brokering agent responds to the client device with the details of how to provide the user interface to the service, which might, for example, include launching the application locally and displaying the user interface from the local instance, streaming the application from a specified stream server and either installing the application locally or running locally from the stream, launching a remote presents client and attaching to the appropriate remote client, server, or shared server to display the service user interface, or launching a web browser to a uniform resource locator (URL) which provides the requested service as a web application.

Figure 2:
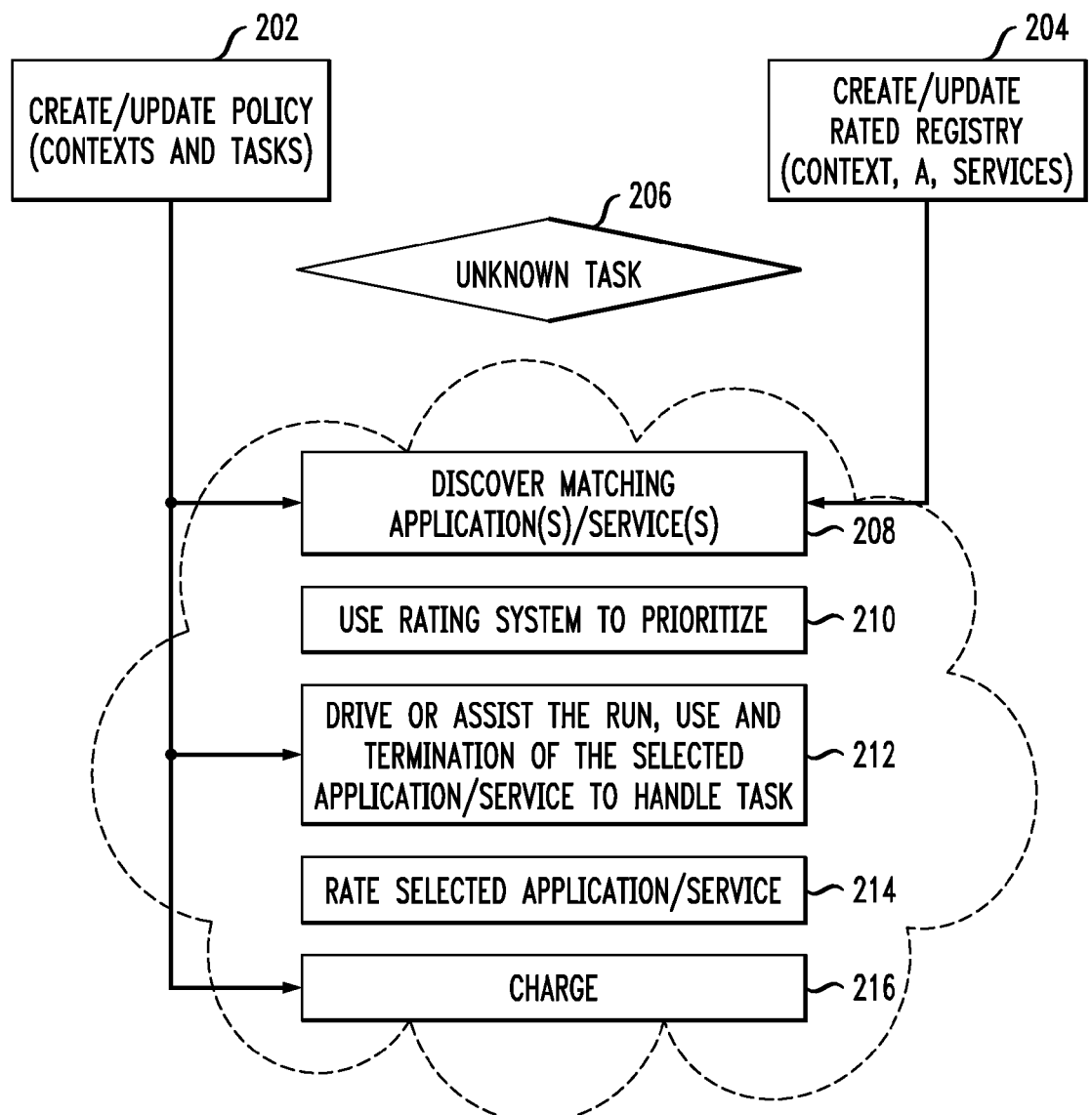
FIG. 2 is a diagram illustrating a workflow for policy-based elastic cloud-driven task execution, according to an embodiment of the present invention.

FIG. 2 is a diagram illustrating a workflow for policy-based elastic cloud-driven task execution, according to an embodiment of the present invention. Step 202 includes creating and/or updating a policy (for example, contexts and tasks). Step 204 includes creating and/or updating a rated registry (for example, a context or services). Unknown task 206 is the starting point of the "solve the task" flow. In the illustration of FIG. 2, there are multiple flows, including the set up/update of the environment. Step 208 includes discovering matching application(s) and service(s). Step 210 includes using a rating system to prioritize matching application(s)/service(s). Step 212 includes driving or assisting the run, use and termination of a selected/prioritized application/service match to handle the unknown task 206. Step 214 includes rating the selected application/service match, and step 216 includes charging. Charging can include, for instance, providing an invoice resulting from billing the service that provided the task.

As detailed herein, choosing a desired or optimum approach for delivering a specific function at a specific time to a specific location and device is dependent on the context and any policies which govern the use to meet risk and privacy guidelines.

In accordance with at least one embodiment of the invention, performing a computing or communications tasks can be dependent of many aspects of the context such as, for example, the user's current location and interaction device (device performance, network connectivity, bandwidth, security, etc.), the type and location of the data items which the user needs to manipulate (file type, file size, home location, security restrictions, etc.), the specific operation the user need to perform on the data (view only—whole document or snippet, edit document, stream document, etc.) and the content of the document itself (steamed media, medical diagnostic image, privacy restricted information, etc.).

Achieving a desired or optimal performance and user experience for a given interaction can also be dependent such aspects. Likewise, there can be many delivery modes available (web app, locally installed app, virtual desktop, application virtualization, etc.), and each of these delivery modes has a specific set of capabilities and challenges.

An aspect of the invention includes pulling together some or all of the above-noted aspects for a specific session and making a context-aware choice of how best to deliver the experience given the situation. Accordingly, in an aspect of the invention, there is a deterministic aspect, given the offline mapping between tasks and potential execution environments for the task, as well as the runtime mapping between a given context and the user's policies. There is also a dynamic aspect, given only few execution environments are selected based on the current policies in place for each user, the ratings, etc.

Examples of contexts include current location, current quality of bandwidth, devices, desktop, mobile, etc. Additionally, the term "context-aware" is used to describe a model of computing in which users interact with different mobile and stationary computers and classify a context-aware system as one that can adapt according to its location of use, the collection of nearby people and objects, and according to the changes of those objects over time.

Organized contexts can help applications to find information needed by comparing a current context to a policy or model. By way of example, a privacy setting may be enforced by storing sensitive context information on the user's personal device and not sharing that information with applications running on another device, while more public information in the hierarchy may be stored in another location, such as public storage or a cloud device, where the information can be shared with applications running in a variety of locations.

As detailed herein, policy can include considerations of performance, security, quality of experience, optimization type (cost for user, capacity for mobile, etc.), etc. With respect to performance, for example, with a user querying a particular file extension and subsequently needing to execute the related application, an aspect of the invention includes evaluating the resource utilization on the local operating environment and determining if additional virtualized resources are needed in an on-demand fashion. Accordingly, that particular application is opened in a performance container that does not conflict with the resources Of the user's local environment.

With respect to security, for example, a user may need to access a potentially unsecure e-mail attachment or file and ensure that it does not corrupt the primary virtual or primary local operating environment. Accordingly, an aspect of the invention includes opening the file in a secure container. Container, as used herein, refers to an environment (application, VM, etc.) that is completely controlled with respect to the assumed security level.

Also, with respect to quality of experience, for example, network location-awareness for a user's device can provide information on the link state that can allow the database directory to enhance how the end user device accesses the application that is tied to the file extension.

Another aspect of the invention includes providing extended relationships/mapping. In at least one embodiment of the invention, this aspect requires a database structure (or file maps or directory of services) listing all known file extensions and the applications which support those (at least within the context of the enterprise or organization to which the user belongs). This might include, for example, listing all known applications for which an enterprise or organization has paid access. A database such as noted above may also contain, in an example embodiment of the invention, relevant metadata regarding the file extension and application to which it corresponds. This may include useful information for understanding a desired method in which to provision the app to the end user device (for example, if using a mobile phone decision), Universal Description, Discovery, and Integration (UDDI) for WebServices related applications, CromOS like related applications on metal, etc.

At least one embodiment of the invention also includes a decision daemon (or analogous process) which runs within the operating environment of the user's device and intelligently senses when elasticity is required upon query of a particular file extension and subsequent calling of the corresponding application. With respect to elasticity, if the file to be executed upon is too large or involves opening an application requiring resources beyond the current limits in the policy (for example, CPU, RAM, number of applications, number of processes, etc.). the elasticity refers to the ability to dynamically find additional resources to match the requirements.

In connection with execution of an example embodiment of the invention, in response to changing conditions, there can be several options for adjustment action (all of which can be chosen based on global policy). For example, capacity of an existing desktop VM can be extended by increasing its resource share of the underlying physical server. Examples include increasing memory size, number of central processing unit (CPU) cores, or storage. This option allows for improvement in user experience.

Another option includes starting a remote application instead of local execution. The application executes on a remote server with the screen and keyboard and mouse events forwarded to the original desktop VM, or, directly to the end user device. Screen (raster) level composition can occur at the end user device or at the VM.

Yet another option includes launching a dedicated virtual machine and starting an application in this newly launched VM. Such an option allows growth of capacity allocated to a desktop user by horizontal scaling, as well as isolating the execution. Additionally, another option includes executing the required task using a web service and appropriately converting the result to be presented in desktop environment. Yet another option includes streaming application binary from the streaming server and executing locally (either on endpoint, or on the VM).

As described herein, an example embodiment of the invention can include a charge feature. Such an embodiment can include displaying a payment option for a per-use fee next to each file extension when a query is made. The software user may look-up the file extension needing access to the app to open it, but will be presented with a payment option to have the app streamed for his/her use for a temporary period. Additionally, such an example embodiment can include enabling a usage limitation based on cost (by way merely of example, "usage limited up to $5 charge").

Figure 3:
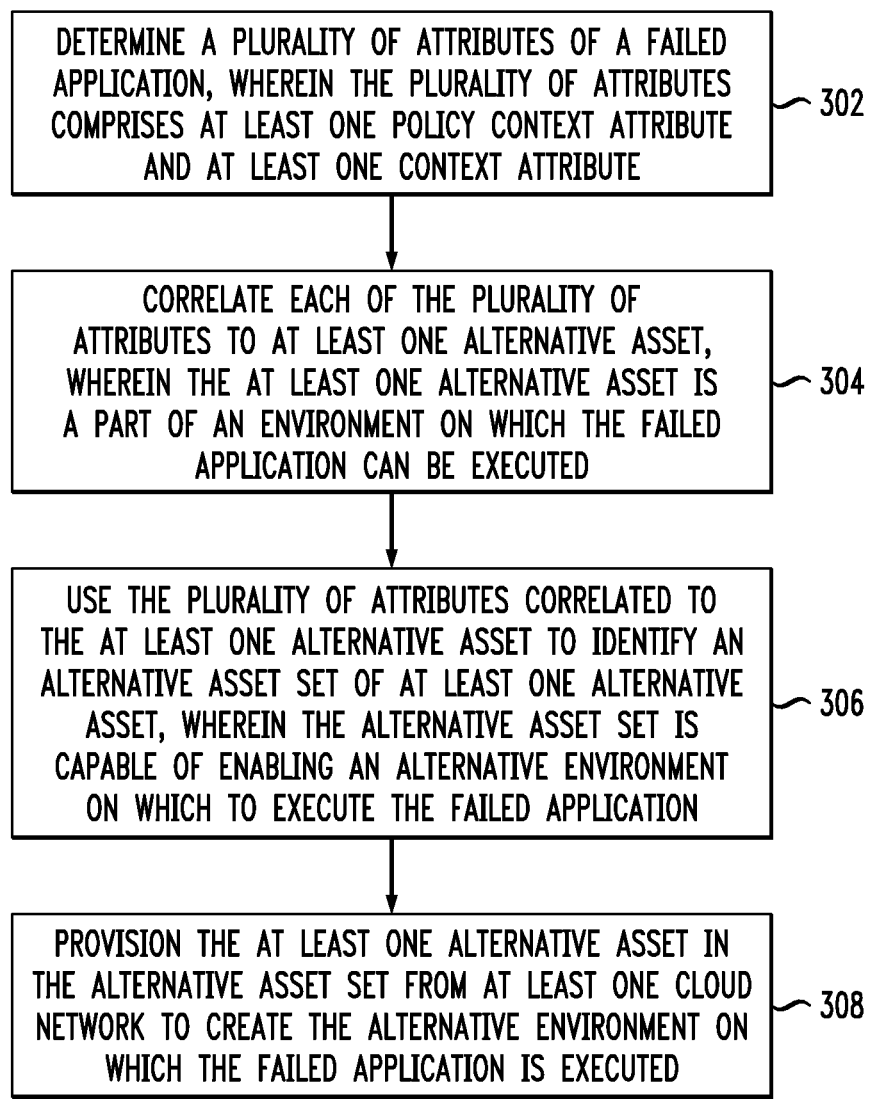
FIG. 3 is a flow diagram illustrating techniques for cloud-driven application execution, according to an embodiment of the invention.

FIG. 3 is a now diagram illustrating techniques for cloud-driven application execution, according to an embodiment of the present invention. Step 302 includes determining a plurality of attributes of a failed application, wherein the plurality of attributes comprises at least one policy context attribute and at least one context attribute. Context attributes can include, for example, a user location, an interaction device attribute, a data type, a data location, a specific operation on data, and a document content attribute.

Step 304 includes correlating each of the plurality of attributes to at least one alternative asset, wherein the at least one alternative asset is a part of an environment on which the failed application can be executed.

Step 306 includes using the plurality of attributes correlated to the at least one alternative asset to identify an alternative asset set of at least one alternative asset (for example, in a registry database), wherein the alternative asset set is capable of enabling an alternative environment on which to execute the failed application.

Step 308 includes provisioning the at least one alternative asset in the alternative asset set from at least one cloud network to create the alternative environment on which the failed application is executed. Creating the alternative environment on which the failed application is executed can include, for example, streaming the application to a client device, launching a server or remote client to execute the application for a client, selecting a shared server execute the application, or launching an instance of the application which is already installed on a client device.

The techniques depicted in FIG. 3 can also include receiving at least one application over at least one of one or more network interfaces, and determining that one of the at least one application is a failed application that cannot be executed in a given environment. Additionally, an embodiment of the invention can further include providing a user interface to the application. Providing a user interface to the application can include, for example, launching the application locally and displaying the user interface from a local instance of the application, streaming the application from a specified stream server and installing the application locally or executing the application locally from the stream, launching a remote presents client and attaching to an appropriate remote client, server, or shared server to display the user interface, or launching a web browser to a uniform resource locator which provides the application as a web application.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a policy engine module, a connection brokering agent module, a policy database module, and a service dispatcher module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include, but is not limited to, computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
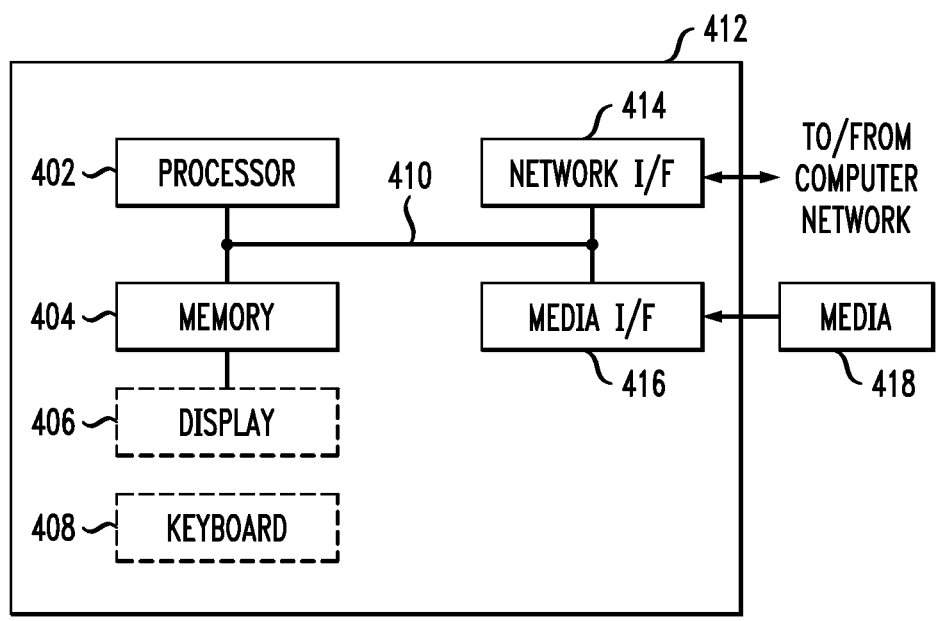
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium computer readable storage medium. A computer readable storage medium may be, for ample, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that he components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect, of the present invention may provide a beneficial effect such as, for example, acceleration of a customer experience and an increase in the functional scope of a desktop experience.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cloud-driven task execution, wherein the method comprises:
   determining a plurality of attributes of a task that is (i) requested by a client device and (ii) precluded from execution on a given operating system of the client device based on a policy consideration of the given operating system, wherein the plurality of attributes comprises at least one policy context attribute and multiple context attributes comprising location of a user associated with the client device, the type of client device, a data type associated with the task, a location of data associated with the task, a given operation to be performed on data associated with the task, and one or more content attributes of data associated with the task;
   correlating each of the plurality of attributes to at least one alternative asset in a cloud network, wherein the at least one alternative asset comprises at least one service that can execute tasks on the given operating system;
   provisioning the at least one alternative asset from the cloud network to the client device to enable execution of the task on the given operating system of the client device;
   wherein at least one of the steps is carried out by a computer device.

2. The method of claim 1, further comprising:
   receiving at least one task over at least one of one or more network interfaces; and
   determining that one of the at least one task is precluded from execution on the given operating system of the client device.

3. The method of claim 1, wherein identifying an alternative asset set comprises identifying an alternative asset set in a registry database.

4. The method of claim 1, wherein said provisioning comprises streaming the task to the client device.

5. The method of claim 1, wherein said provisioning comprises launching a server or remote client to execute the task for a client.

6. The method of claim 1, wherein said provisioning comprises selecting a shared server to execute the task.

7. The method of claim 1, wherein said provisioning comprises launching an instance of the task which is already installed on the client device.

8. The method of claim 1, further comprising:
   providing a user interface to the task.

9. The method of claim 8, wherein providing a user interface comprises launching the task locally and displaying the user interface from a local instance of the task.

10. The method of claim 8, wherein providing a user interface comprises streaming the task from a specified stream server and installing the task locally or executing the task locally from the specified stream server.

11. The method of claim 8, wherein providing a user interface comprises launching a remote client and attaching to an appropriate remote client, server, or shared server to display the user interface.

12. The method of claim 8, wherein providing a user interface comprises launching a web browser to a uniform resource locator which provides the task as a web application.

13. An article of manufacture comprising a computer readable storage memory having computer readable instructions tangibly embodied thereon which, when implemented, cause a computer to carry out a plurality of method steps comprising:
   determining a plurality of attributes of a task that is (i) requested by a client device and (ii) precluded from execution on a given operating system of the client device based on a policy consideration of the given operating system, wherein the plurality of attributes comprises at least one policy context attribute and multiple context attributes comprising location of a user associated with the client device, the type of client device, a data type associated with the task, a location of data associated with the task, a given operation to be performed on data associated with the task, and one or more content attributes of data associated with the task;
   correlating each of the plurality of attributes to at least one alternative asset in a cloud network, wherein the at least one alternative asset comprises at least one service that can execute tasks on the given operating system;
   provisioning the at least one alternative asset from the cloud network to the client device to enable execution of the task on the given operating system of the client device.

14. The article of manufacture of claim 13, wherein the computer readable instructions which, when implemented, further cause a computer to carry out a method step comprising:
   receiving at least one task over at least one of one or more network interfaces; and
   determining that one of the at least one task is precluded from execution on the given operating system of the client device.

15. The article of manufacture of claim 13, wherein identifying an alternative asset set comprises identifying an alternative asset set in a registry database.

16. The article of manufacture of claim 13, wherein the computer readable instructions which, when implemented, further cause a computer to carry out a method step comprising:
   providing a user interface to the task.

17. A system for cloud-driven task execution, comprising:
   a memory; and
   at least one processor coupled to the memory and operative for:
      determining a plurality of attributes of a task that is (i) requested by a client device and (ii) precluded from execution on a given operating system of the client device based on a policy consideration of the given operating system, wherein the plurality of attributes comprises at least one policy context attribute and multiple context attributes comprising location of a user associated with the client device, the type of client device, a data type associated with the task, a location of data associated with the task, a given operation to be performed on data associated with the task, and one or more content attributes of data associated with the task;
      correlating each of the plurality of attributes to at least one alternative asset in a cloud network, wherein the at least one alternative asset is comprises at least one service that can execute tasks on the given operating system;
      provisioning the at least one alternative asset from the cloud network to the client device to enable execution of the task on the given operating system of the client device.

18. The system of claim 17, wherein the at least one processor coupled to the memory is further operative for:
   receiving at least one task over at least one of one or more network interfaces; and
   determining that one of the at least one task is precluded from execution on the given operating system of the client device.

19. The system of claim 17, wherein the at least one processor coupled to the memory operative for identifying an alternative asset set is further operative for identifying an alternative asset set in a registry database.

20. The system of claim 17, wherein the at least one processor coupled to the memory is further operative for:
   providing a user interface to the task.

* * * * *